US006327283B1

(12) United States Patent
Hung

(10) Patent No.: US 6,327,283 B1
(45) Date of Patent: Dec. 4, 2001

(54) WAVELENGTH SWITCHED LASER SOURCE

(75) Inventor: Henry Hung, Paradise Valley, AZ (US)

(73) Assignee: Micro Photonix Integration Corporation, Phoenix, AZ (US)

( * ) Notice: Subject to any disclaimer, the term of this patent is extended or adjusted under 35 U.S.C. 154(b) by 0 days.

(21) Appl. No.: 09/810,893

(22) Filed: Mar. 17, 2001

(51) Int. Cl.[7] .......................................................... H01S 3/10

(52) U.S. Cl. ................................................................ 372/23

(58) Field of Search .................................................. 372/23

Primary Examiner—Leon Scott, Jr.
(74) Attorney, Agent, or Firm—Donald J. Lenkszus, P.C

(57) ABSTRACT

A laser source in accordance with the invention includes a broadband laser generating optical output signals including a plurality of predetermined wavelength components. A bi-directional optical switch having a first port and a plurality of second ports is responsive to control signals for establishing an optical coupling between said first port and a selected one of the plurality of second ports. A circulator having a first port is coupled to the broadband laser, a circulator second port is coupled to the bi-directional optical switch first port and a circulator third port provides output optical signals. A plurality of wavelength selective reflectors is provided. Each wavelength selective reflector is coupled to a corresponding one the optical switch second ports, each of the wavelength selective reflectors reflects optical signals at a predetermined one optical wavelength selected from a plurality of predetermined optical wavelength. Apparatus is provided for generating the control signals. The control signal generating apparatus comprises a micro controller in one embodiment of the invention.

26 Claims, 6 Drawing Sheets

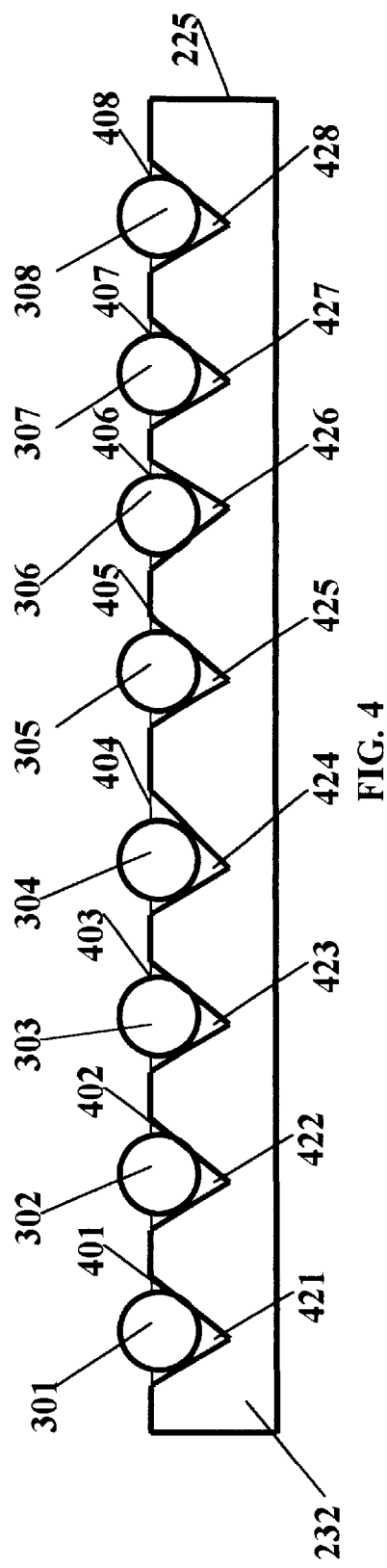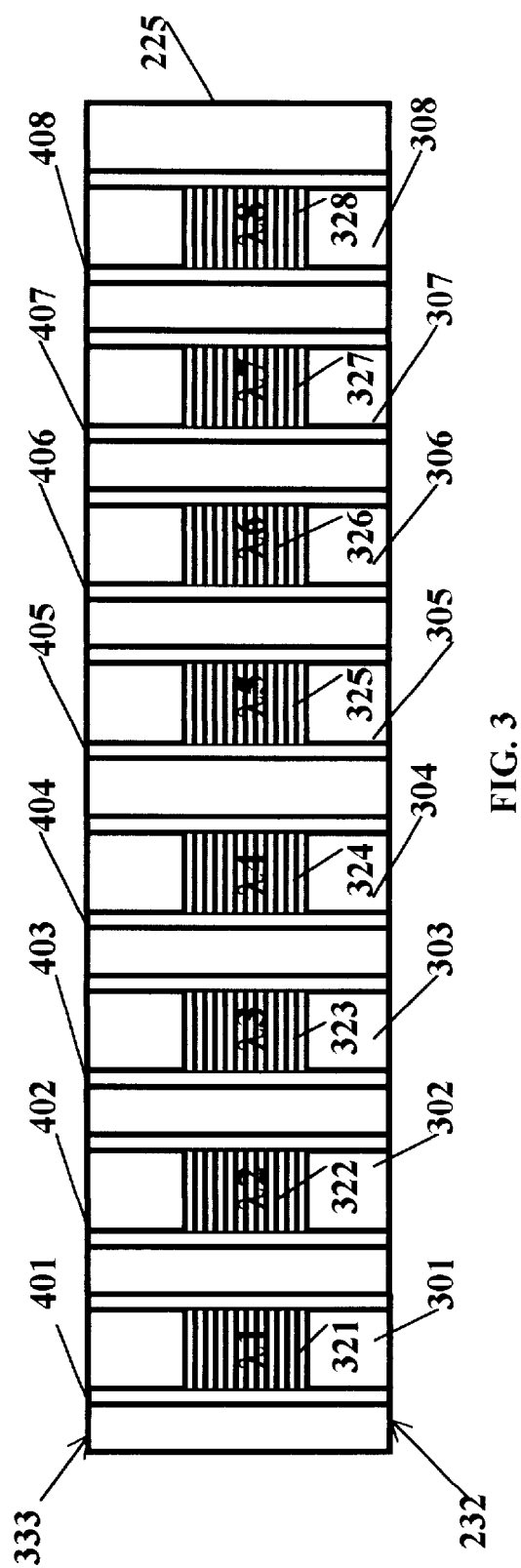

WAVELENGTH SWITCHED LASER SOURCE

BACKGROUND OF THE INVENTION

This invention relates to optical communications systems, in general, and to a laser source for use in such communications systems, in particular.

It is desirable to provide a laser source that can provide an optical output that is switchable to a plurality of different wavelengths. It is particularly desirable that such a laser source be capable of switching from one wavelength to another at a rapid rate.

SUMMARY OF THE INVENTION

A laser source in accordance with the invention includes a broadband laser generating optical output signals including a plurality of predetermined wavelength components. A bi-directional optical switch having a first port and a plurality, N, of second ports, is responsive to control signals for establishing an optical coupling between said first port and a selected one of the plurality of second ports. A circulator having a first port is coupled to the broadband laser, a second port is coupled to the bi-directional optical switch first port and a third port for providing output optical signals. A plurality of wavelength selective reflectors is provided. Each wavelength selective reflector is coupled to a corresponding one the optical switch second ports, each of the wavelength selective reflectors reflects optical signals at a predetermined one optical wavelength selected from a plurality of predetermined optical wavelength. Apparatus is provided for generating the control signals. The control signal generating apparatus comprises a micro controller in one embodiment of the invention.

In one embodiment in accordance with the invention, bias circuitry is coupled to the bi-directional optical switch and to the micro controller.

In an embodiment in accordance with the invention an optical switch is formed on a first substrate of electro-optic material. The substrate comprises $LiNbO_3$.

A second substrate carrying said plurality of wavelength selective reflectors. In one embodiment, the second substrate comprises silicon and is bonded to said first substrate.

Each reflective filter comprises a Bragg grating that in one embodiment of the invention is a fiber Bragg grating.

BRIEF DESCRIPTION OF THE DRAWING

The invention will be better understood from a reading of the following detailed description taken in conjunction with the several drawing figures in which like reference designations are used to identify like elements in the figures, and in which:

FIG. 3 illustrates a specific structure in accordance with the embodiment of FIG. 2;

FIG. 4 illustrates a portion of the structure of FIG. 3 in greater detail;

DETAILED DESCRIPTION

Figure 1:
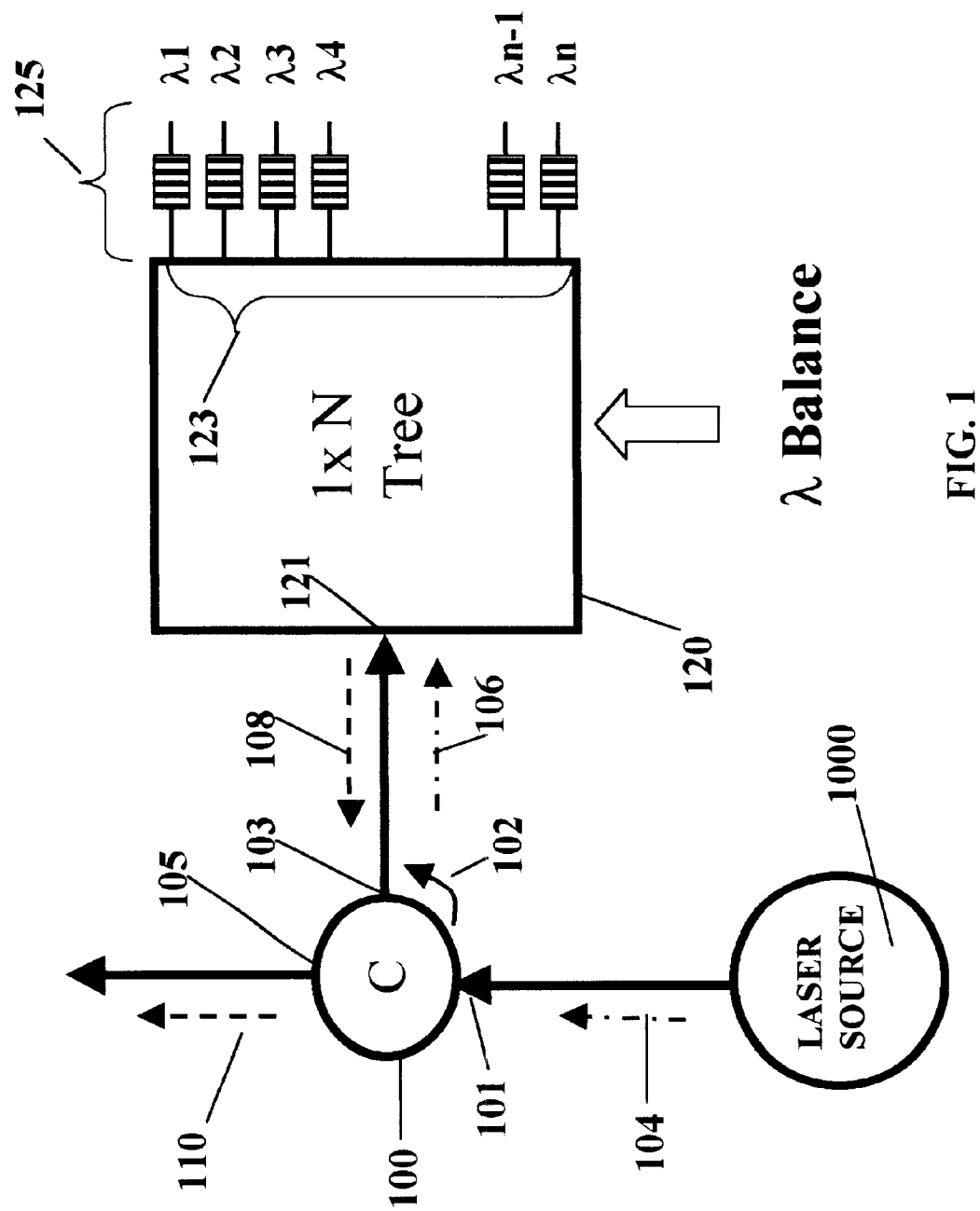
FIG. 1 shows a structure in accordance with the principles of the invention.

FIG. 1 illustrates the general configuration of a wavelength switchable laser in accordance with the principles of the invention. Optical signals from a broadband laser source 1000 are applied to an input port 101 of a three port optical circulator 100. Broadband laser source 1000 has wavelength components at the wavelengths of interest and may be any broadband laser source of a type known in the art. Optical circulator 100 has a second port 103 coupled to optical switch 110. A third port 105 serves as an output port. Circulator 100 may be any one of a number of known circulators. An isolator may be inserted into the optical path coupling the source of optical signals to port 101 to make port 101 unidirectional. Similarly. an optical isolator may be inserted into the optical path coupled to port 105 so that optical signals flow unidirectionally out from port 105. Port 103 is a bi-directional port that receives broadband optical signals from port 101 and couples a selected optical signal wavelength component received at port 103 to port 105. The polarity of circulator 100 is indicated by directional arrow 102. The flow of input optical signals to switch 120 is shown by arrows 104, 106. The flow of wavelength selected optical output signals from optical switch 120 to port 103 and out from port 105 is shown by arrows 108, 110. Optical switch 120 is operable to couple port 121 to any one of a plurality, n, of ports 123. Each of the plurality of ports 123 has coupled thereto a corresponding one of a plurality of reflective wavelength filters 125. Each reflective wavelength filter is a narrow filter and in the illustrative embodiment may be either a fiber Bragg grating or a dielectric interference filter. Both fiber Bragg gratings and dielectric interference filters are known in the art. Each wavelength filter is selected to reflect optical signals that are only at a specific centerline wavelength designated as $\lambda 1 - \lambda n$. The number of filters 125 utilized is dependant upon the specific application and the incremental wavelength difference between adjacent selected wavelengths. Stated another way, the number of filters is determined by the wavelength range over which tuning is to occur and the incremental wavelength, or wavelength granularity between selections. Optical switch 120 receives wavelength selection signals and couples port 121 to a selected one of ports 123 based upon the selection signals. The selected one of ports 123 is made based upon the desired wavelength of optical signals desired. Each of the narrow filters 125 reflects optical signals only at the particular center wavelength of the filter and passes or in effect absorbs all other optical signals. Input optical signals received at circulator 100 port 101 are coupled to port 103 and coupled to port 121 of switch 120. Switch 102 couples the optical signals to a selected one of filters 125. The selected filter 125 is determined by wavelength select signals received by switch 120.

The selected filter 125 reflects only optical signals at the selected wavelength back to port 121 and thence to circulator 100 port 103. The selected wavelength optical signals are coupled out of circulator 100 at port 105. In a first embodiment of the invention, 1×N optical switch 120 is an electro-mechanical switch of a type well known in the art or a thermal-optic switch also of a type known in the art. In a second embodiment of the invention, 1×N optical switch 120 is an integrated optic waveguide switch formed on a $LiNbO_3$ substrate or a substrate of other electro-optic material. This embodiment has the advantages of a high wavelength channel count, fast switch speed and small size.

Figure 2:
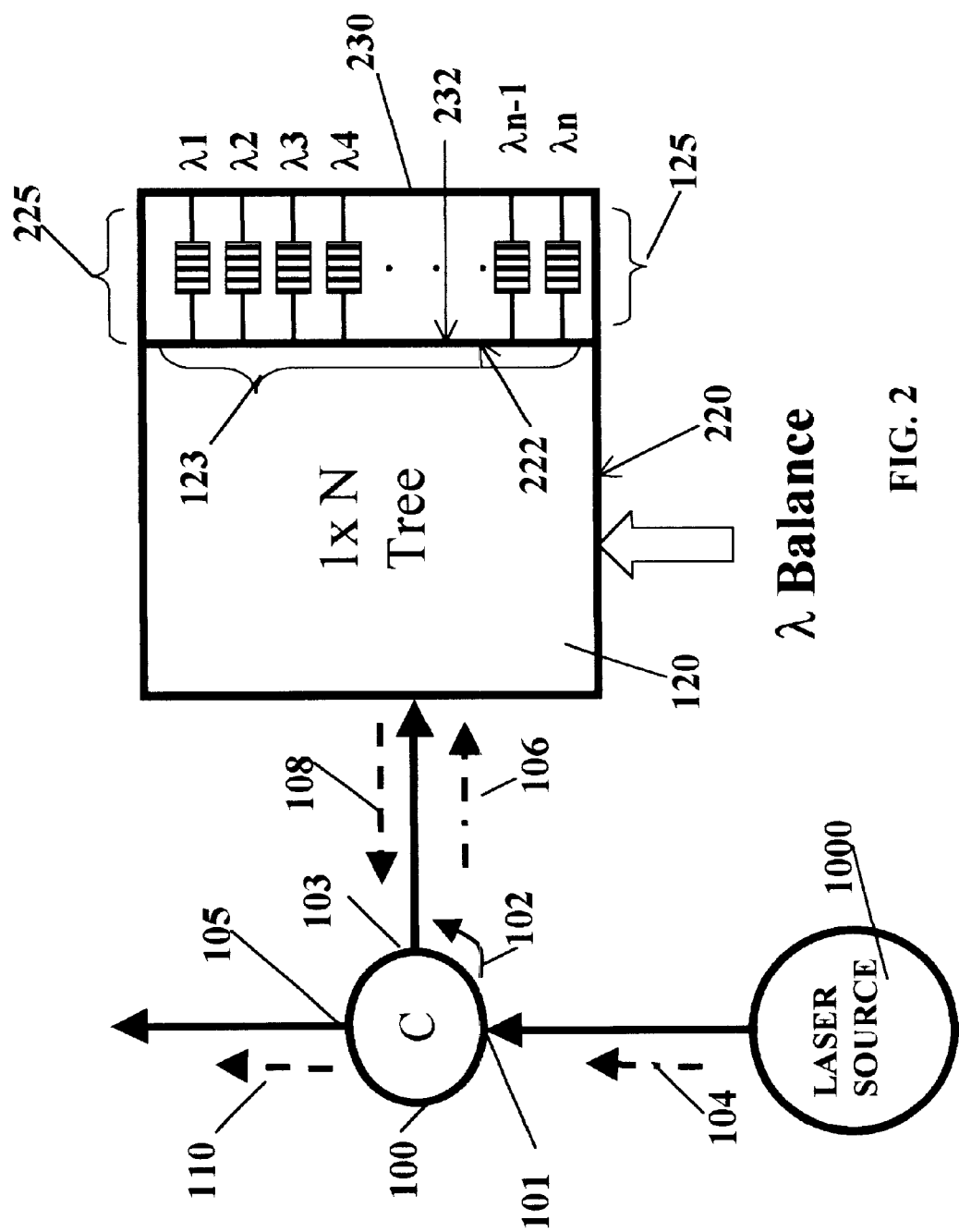
FIG. 2 is a second embodiment in accordance with the principles of the invention.

In a second embodiment of a wavelength selectable laser source in accordance with the invention shown in FIG.2, 1×N optical switch 120 is again formed on a LiNbO₃ substrate 220 or a substrate of other electro-optic material. Particular details of the 1×N switch structure are not shown on the structure of FIG. 2, however, in this particularly advantageous embodiment of the invention, the plurality of filters 125 is arranged as a fiber Bragg grating array 225 of filters. A plurality, n, of fiber Bragg gratings 225 are provided on a separate substrate 230 that is affixed to substrate 220. More specifically, a plurality, n, of fiber Bragg gratings 225 are bonded to grooves or channels formed on the surface of a substrate 230. In the specific embodiment shown, substrate 230 is selected to be a silicon substrate. The end surface 232 of substrate 230 that is adjacent to substrate 220 is polished. End surface 232 is bonded to surface 222 of 1×N optical switch substrate 220. Bonding of substrate 220 to substrate 230 may be by any one of several known arrangements for bonding substrates together.

FIGS. 3 and 4 show a fiber Bragg grating array 225 with 8 fiber Bragg grating filters $\lambda 1-\lambda 8$. Each of the fiber Bragg grating filters $\lambda 1-\lambda 8$ is a separate fiber segment 301–308 having a Bragg grating 321–328 formed thereon. Each fiber segment is a photosensitive fiber onto which a Bragg grating is formed by using ultraviolet light in conjunction with a different period phase mask for each different filter center wavelength. The forming of Bragg gratings on fibers utilizing such a technique is known in the art. Silicon substrate 230 has a plurality of grooves 401–408 formed on a top surface 412. Each of the grooves 401–408 is shown as a "v" groove, but may be of different cross sectional shape, and rather than being shaped as a "groove" may be a channel. By use of the term "channel", it will be understood that various cross-sectional grooves is included. In the embodiment shown, the grooves or channels may be formed by use of a saw, or by etching or any other process that will permit controlled depth formation of channels. For example, the v-grooves may be formed by providing an oxide masking layer on the silicon substrate, utilizing a photolithography process to define each of the grooves, and applying an etchant to form the grooves 401–408. After the grooves 401–408 are formed, the fiber segments 301–308 are placed in the grooves 401–408 with fixed spacing and are bonded in position with epoxy. The end surfaces 232, 333 of substrate 230 as well as the corresponding end faces of fiber segments 301–308 are coplanar and polished to optical quality. The corresponding end surface 222 of substrate 220 is likewise polished to optical quality. The fiber Bragg grating array 225 is aligned with the 1×N switch substrate 220 and bonded thereto. The bonding may with epoxy or any other method of bonding that provides good optical coupling.

Figure 5:
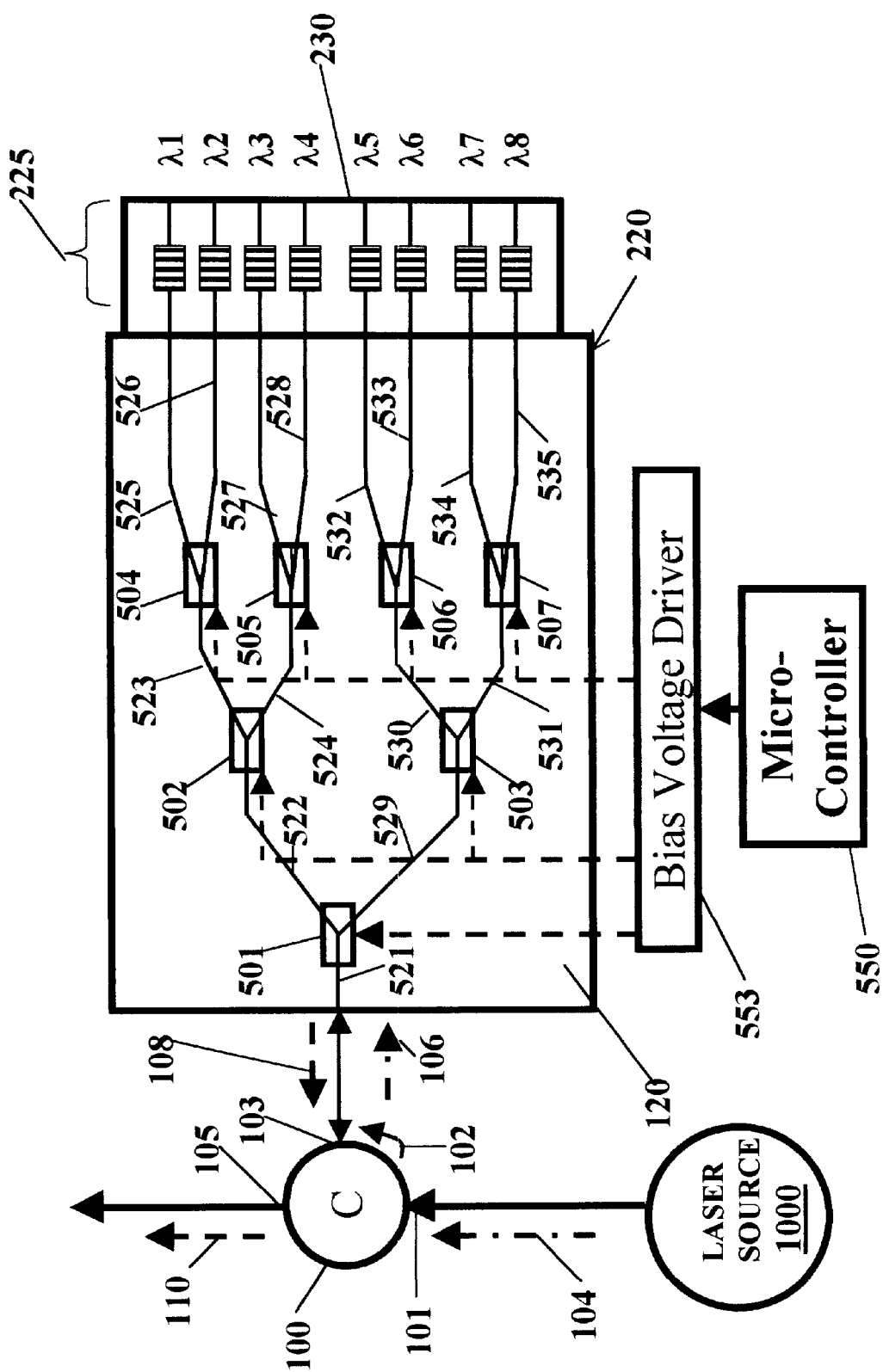
FIG. 5 is a top view of a fiber Bragg grating array in accordance with one aspect of the present invention.

Turning now to FIG. 5, the wavelength selectable laser source of FIG. 2 is shown with broadband laser source 1000 coupled to 1×N optical switch 120 via circulator 100 as in FIGS. 1 and 2. Optical switch 120 is shown in greater functional detail. 1×N optical switch 125 is formed from a tree of 1×2 optical switches 501–507 and waveguides 521–535. Switches 501–507 are selectively operated by a microprocessor or micro controller 550 that responds to wavelength signals indicating a desired optical wavelength and determines which optical switches 501–507 to operate to couple optical signals to the corresponding one fiber Bragg grating 125 of array 225.

Figure 6:
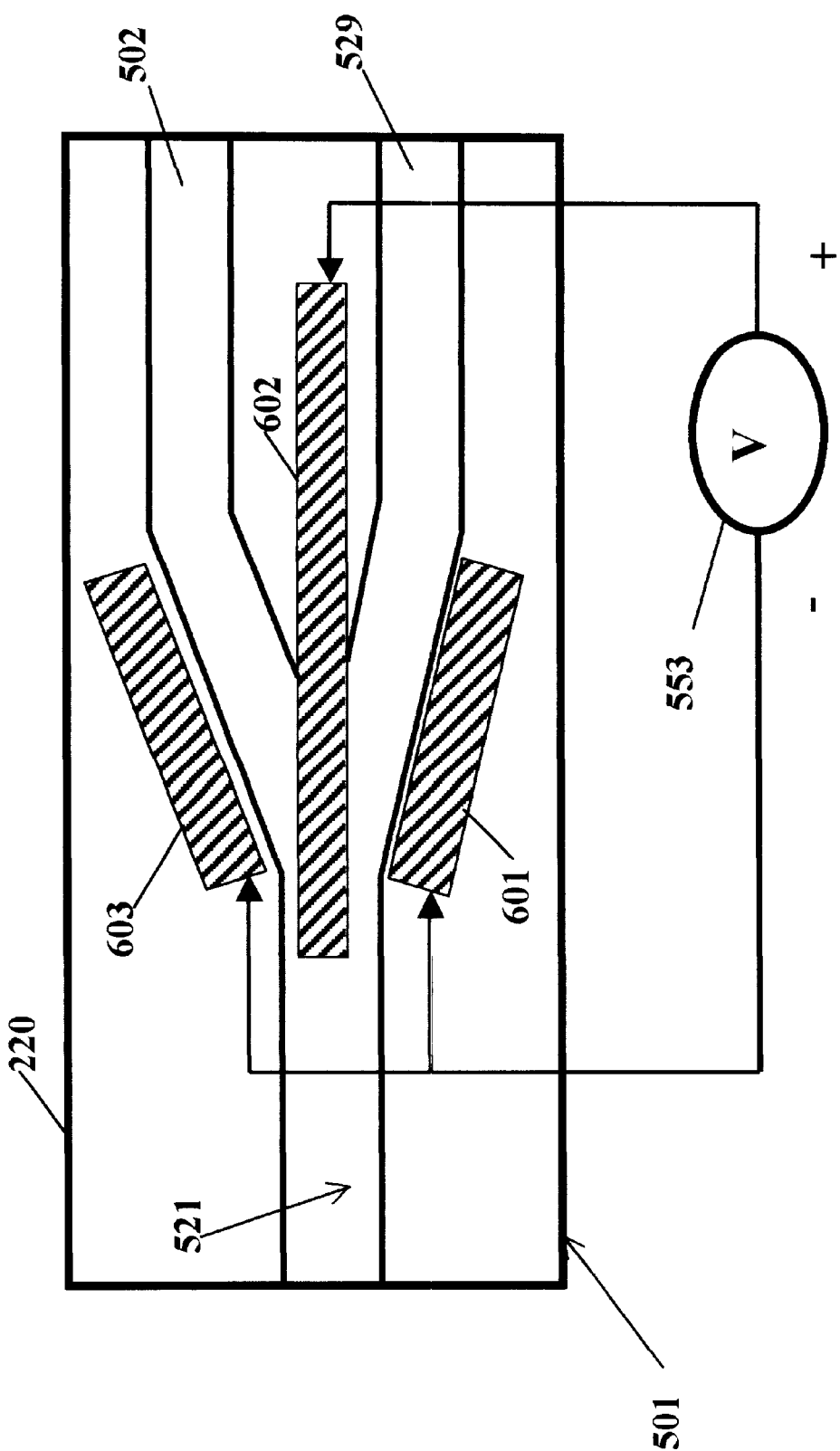
FIG. 6 is an end view of the array of FIG. 5.

FIG. 6 illustrates a 1×2 switch 501 that is appropriate for use in the 1×N switch arrangement 220 of the invention. Switch 501 is a bi-directional, polarization independent 1×2 switch design. It includes a waveguide that forms a "y" having first, second and third waveguide legs 521, 522, 529. The waveguides 521, 522, 529 are formed on a substrate utilizing known fabrication methods for forming optical waveguides on electro optic substrates such as LiNbO₃. Switch 501 further includes three electrodes 601, 602, 603 that are used to determine the optical path through switch 501. The application of bias voltage V to electrodes 601, 602, 603 determines whether waveguide portion 521 is coupled to waveguide portion 522 or 529. The high voltage switch 501 can switch both TE and TM mode signals. Switch 501 has an on-off ratio of greater than 20 dB. In a reflective design, a double pass produces 40 dB of isolation. With this building block switch structure other sized switches may be provided.

Although switch 501 is shown in detail in FIG. 6, each of the switches 501–507 is of the same construction and all are fabricated on a single substrate 220 in the illustrative embodiment. The waveguides 521–535 are formed utilizing any of the known techniques for formation of waveguides in electro-optic substrates.

Figure 7:
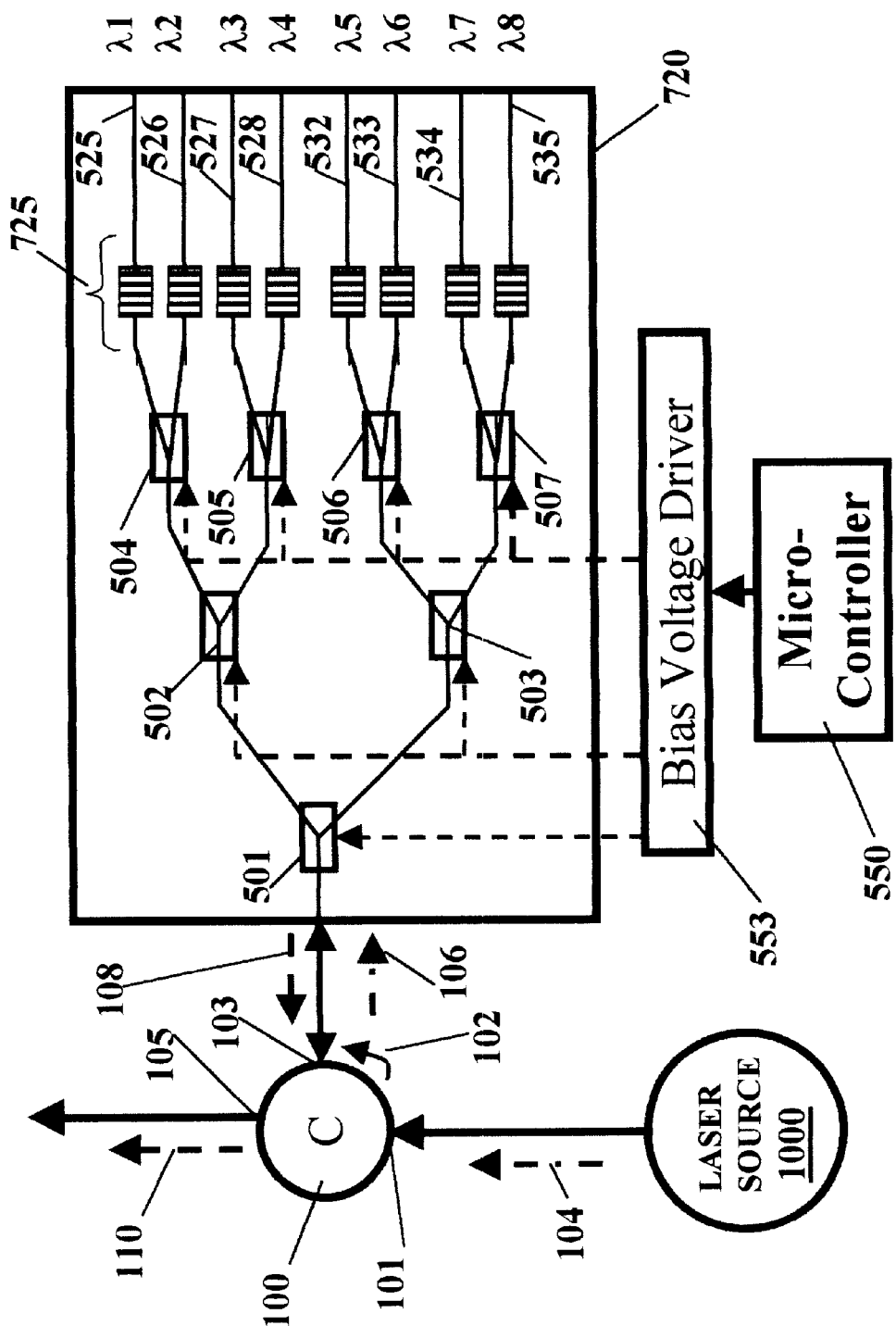
FIG. 7 illustrates an alternate embodiment of the structure of FIG. 3.

FIG. 7 illustrates another embodiment of the invention in which the reflective filters 525–535 are formed on the same substrate 720 as the 1×N switch. The substrate is LiNbO₃ or another electro optic material. Each filter 725 is formed on a waveguide 525–528, 532–535 formed on substrate 720. Each waveguide has a photosensitive region onto which a Bragg grating is formed. Operation of the structure of FIG. 7 is the same as that of FIG. 5.

It should be apparent to those skilled in the art that although the structures shown in the drawing figures illustrate only a 1×8 switch and 8 wavelengths, the number of wavelengths and the size of the 1×N switch is a matter of design selection to provide the desired number of selectable wavelengths. For example, 1×16 and 1×32 switches can be built such that the laser source has 16 and 32 selectable wavelengths. If it is desired to accommodate a larger number of wavelengths, cascading several stages can accommodate more wavelengths. For example, to accommodate 128 wavelengths, a 1×4 switch can be cascaded with four 1×32 switches.

Various other changes and modifications may be made to the illustrative embodiments of the invention without departing from the spirit or scope of the invention. It is intended that the invention not be limited to the embodiments shown, but that the invention be limited in scope only by the claims appended hereto.

What is claimed is:

1. A laser system, comprising:
   a broadband laser generating optical output signals including a plurality of predetermined wavelength components,
   a bi-directional optical switch having a first port and a plurality, N, of second ports, said bi-directional optical switch establishing an optical coupling between said first port and a selected one of said plurality of second ports;
   a circulator having a first port coupled to said broadband laser, a second port coupled to said first port of said bi-directional optical switch and a third port for providing output optical signals;
   a plurality of wavelength selective reflectors, each being coupled to a corresponding one of said optical switch second ports, and each reflecting optical signals at a predetermined one optical wavelength selected from a plurality of predetermined optical wavelengths; and
   an apparatus for generating control signals;
   whereby said control signals operate said bi-directional optical switch to select a wavelength selective reflector such that said optical output signals are coupled to said selected wavelength selective reflector to produce optical signals at a selected wavelength at said circulator third port.

2. A laser system in accordance with claim 1, wherein:
said apparatus comprises a micro controller.

3. A laser system in accordance with claim 1, comprising:
a first substrate of electro-optic material, said bi-directional optical switch being formed on said first substrate.

4. A laser system in accordance with claim 3, wherein:
said bi-directional optical switch comprises a 1×N switch.

5. A laser system in accordance with claim 4, wherein:
said first substrate comprises LiNbO$_3$.

6. A laser system in accordance with claim 3 comprising:
a second substrate carrying said plurality of wavelength selective reflectors.

7. A laser system in accordance with claim 6, wherein:
said second substrate comprises silicon.

8. A laser system in accordance with claim 7, wherein:
said second substrate is bonded to said first substrate.

9. A laser system in accordance with claim 1, wherein:
each of said wavelength selective reflectors comprises a reflective filter.

10. A laser system in accordance with claim 9, wherein:
each of said reflective filters comprises a Bragg grating.

11. A laser system in accordance with claim 10, wherein:
said second substrate comprises silicon.

12. A laser system in accordance with claim 11, wherein:
said first substrate comprises LiNbO$_3$.

13. A laser system accordance with claim 9, wherein:
each of said reflective filters comprises a fiber Bragg grating.

14. A laser system in accordance with claim 1, comprising:
a first substrate of electro-optic material, said optical switch being formed on said first substrate; and
a second substrate, said plurality of wavelength selective reflectors being formed on said second substrate.

15. A laser system in accordance with claim 14, wherein:
each of said wavelength selective comprises a Bragg grating.

16. A laser system source in accordance with claim 15, wherein:
each said Bragg grating is a fiber Bragg grating.

17. A laser system in accordance with claim 14, wherein:
said second substrate is bonded to said first substrate.

18. A laser system in accordance with claim 1, wherein:
said bi-directional optical switch is polarization independent.

19. A laser system in accordance with claim 1, wherein:
said optical switch is a 1×N switch.

20. A laser system, comprising:
a broadband laser generating optical output signals including a plurality of predetermined wavelength components;
a substrate of electro-optic material;
a bi-directional optical switch formed on said substrate, said bi-directional optical switch having a first port and a plurality, N, of second ports, said bi-directional optical switch establishing an optical coupling between said first port and a selected one of said plurality of second ports;
a circulator having a first port coupled to said broadband laser, a second port coupled to said bi-directional optical switch first port and a third port;
a plurality of wavelength selective reflectors formed on said substrate, each being coupled to a corresponding one of said optical switch second port, each reflecting optical signals at a predetermined one optical wavelength selected from a plurality of predetermined optical wavelengths; and
a micro controller coupled to said bi-directional optical switch to selectively operate said switch to couple said circulator second port to a predetermined one of said wavelength elective reflectors
whereby said micro controller operates said switch to select a wavelength selective reflector such that said optical output signals are coupled to said selected wavelength selective reflector to produce optical signals at a selected wavelength at said circulator third port.

21. A laser system in accordance with claim 20, wherein:
said bi-directional optical switch comprises a 1×N switch.

22. A laser system in accordance with claim 21, wherein:
said substrate comprises LiNbO$_3$.

23. A laser system in accordance with claim 21, wherein:
each of said wavelength selective reflectors comprises a reflective filter.

24. A laser system in accordance with claim 23, wherein:
each of said reflective filters comprises a Bragg grating.

25. A laser system in accordance with claim 20, wherein:
said optical switch is polarization independent.

26. A laser system in accordance with claim 25, wherein:
said bi-directional optical switch is a 1×N switch.

* * * * *